(12) United States Patent
Toida et al.

(10) Patent No.: US 11,387,475 B2
(45) Date of Patent: Jul. 12, 2022

(54) FUEL CELL SYSTEM

(71) Applicant: TOYOTA JIDOSHA KABUSHIKI KAISHA, Toyota (JP)

(72) Inventors: Masashi Toida, Nagoya (JP);
Tomotaka Ishikawa, Nagoya (JP);
Yusuke Nishida, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/218,361

(22) Filed: Mar. 31, 2021

(65) Prior Publication Data

US 2021/0376358 A1 Dec. 2, 2021

(30) Foreign Application Priority Data

May 27, 2020 (JP) .............................. JP2020-092144

(51) Int. Cl.
| | | |
|---|---|---|
| *H01M 8/04858* | (2016.01) | |
| *H01M 8/04537* | (2016.01) | |
| *H01M 8/0432* | (2016.01) | |
| *H01M 8/04302* | (2016.01) | |

(52) U.S. Cl.
CPC ..... *H01M 8/04895* (2013.01); *H01M 8/0432* (2013.01); *H01M 8/04302* (2016.02); *H01M 8/04574* (2013.01)

(58) Field of Classification Search
None
See application file for complete search history.

(56) References Cited

U.S. PATENT DOCUMENTS

2016/0141675 A1* 5/2016 Kaneko ............. H01M 8/04559
429/432
2017/0187053 A1* 6/2017 Hoshi ............... H01M 8/04738

FOREIGN PATENT DOCUMENTS

JP 2020014353 A 1/2020

* cited by examiner

*Primary Examiner* — Brian R Ohara
*Assistant Examiner* — Patrick Marshall Greene
(74) *Attorney, Agent, or Firm* — Dickinson Wright, PLLC

(57) ABSTRACT

A fuel cell system includes a fuel cell a temperature acquisition unit that acquires a temperature of the fuel cell, a cell unit voltage sensor that detects a voltage of each of fuel cell units, and a controller that controls the fuel cell system. The controller restricts an output current of the fuel cell when the voltage of the individual fuel cell unit becomes equal to or lower than a predetermined value in a warm-up operation, execute the warm-up operation when the temperature of the fuel cell is equal to or lower than a predetermined temperature, after the fuel cell system receives a start-up request, and stop an operation of the fuel cell system when a stop condition including that the voltage of the fuel cell unit is continuously equal to or lower than a predetermined voltage value for a predetermined time is satisfied after start of the warm-up operation.

3 Claims, 5 Drawing Sheets

FUEL CELL SYSTEM

CROSS-REFERENCE TO RELATED APPLICATION

This application claims priority to Japanese Patent Application No. 2020-092144 filed on May 27, 2020, incorporated herein by reference in its entirety.

BACKGROUND

1. Technical Field

The present disclosure relates to a fuel cell system.

2. Description of Related Art

Since water is generally generated in a fuel cell during power generation, liquid water may be accumulated in a reaction gas passage in the fuel cell. When a fuel cell vehicle with the fuel cell mounted thereon is started under a temperature condition below a freezing point, in a case where the liquid water accumulated in the fuel cell is frozen, reaction gas cannot sufficiently flow inside the fuel cell. As a result, the power generation of the fuel cell may be hindered. In Japanese Unexamined Patent Application Publication No. 2020-14353 (JP 2020-14353 A), a technique for determining freezing of a fuel cell based on a generated charge amount after a start of power generation of the fuel cell when a temperature of the fuel cell is below a freezing point is proposed.

SUMMARY

A technique for determining freezing based on a phenomenon that actually occurs in the fuel cell when the fuel cell is started at a low temperature, such as the technique disclosed in JP 2020-14353 A, is superior to a technique for indirectly estimating a freezing state based on a temperature of a refrigerant circulated in the fuel cell or the like in that freezing determination is accurately performed. On the other hand, even in a case where determination is made that freezing is not performed when the fuel cell is started at the low temperature, it is conceivable that a passage of reaction gas inside the fuel cell is frozen due to a decrease in outside temperature or liquid water is frozen by moving to a place in the passage of the reaction gas where a temperature is lower than zero degrees by a warm-up operation, and the passage of the reaction gas is blocked, whereby generated water in the fuel cell is frozen. Therefore, further improvement is needed for determination of the freezing state based on the phenomenon that actually occurs in the fuel cell.

The present disclosure can be realized in the following aspects.

(1) An aspect of the present disclosure relates to a fuel cell system. The fuel cell system includes a fuel cell, a current sensor, a temperature acquisition unit, a cell unit voltage sensor, and a controller. The fuel cell includes a plurality of stacked fuel cell units. The current sensor is configured to acquire an output current of the fuel cell. The temperature acquisition unit is configured to acquire a temperature of the fuel cell. The cell unit voltage sensor is configured to detect a voltage of each of the fuel cell units. The controller is configured to control the fuel cell system. The controller is configured to restrict the output current of the fuel cell when the voltage of the individual fuel cell unit becomes equal to or lower than a predetermined value in a warm-up operation, execute the warm-up operation when the temperature of the fuel cell is equal to or lower than a predetermined temperature, after the fuel cell system receives a start-up request, and stop an operation of the fuel cell system when a stop condition including that the voltage of the fuel cell unit is continuously equal to or lower than a predetermined voltage value for a predetermined time is satisfied after start of the warm-up operation. In a case where a voltage value of a unit cell voltmeter is equal to or lower than a predetermined voltage value for a predetermined time, there is a possibility that freezing that is difficult to be thawed by the warm-up operation occurs in the fuel cell. When the fuel cell system is continuously warmed up in this state, power is consumed more than generated power. In the aspect, in such a case, the operation of the fuel cell system is stopped by the controller. With this, it is possible to avoid a situation in which power is continuously consumed more than generated power.

(2) In the fuel cell system according to the aspect, the controller may be configured to set the predetermined time according to the temperature of the fuel cell acquired by the temperature acquisition unit. In the aspect, in a case where determination is made that the temperature of the fuel cell acquired by the temperature acquisition unit is a temperature at which it is difficult to thaw the freezing in the fuel cell even though the warm-up operation is continued, the fuel cell system is stopped early, whereby power consumption of the fuel cell system can be suppressed.

(3) In the fuel cell system according to the aspect, the stop condition may include that a generated charge amount after the fuel cell system receives the start-up request is equal to or greater than a predetermined threshold value after the start of the warm-up operation, the generated charge amount being calculated by using the output current of the fuel cell. In a case where the generated charge amount is equal to or greater than the predetermined threshold value, it is considered that the fuel cell generates heat enough to eliminate the freezing in the fuel cell. Nevertheless, in a case where the voltage becomes equal to or lower than the predetermined voltage value, it is considered that the freezing occurs in the fuel cell after the generated charge amount becomes equal to or greater than the predetermined threshold value. In the aspect, in this case, the operation of the fuel cell system is stopped, whereby it is possible to avoid a situation in which power is continuously consumed more than generated power.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

Figure 1:
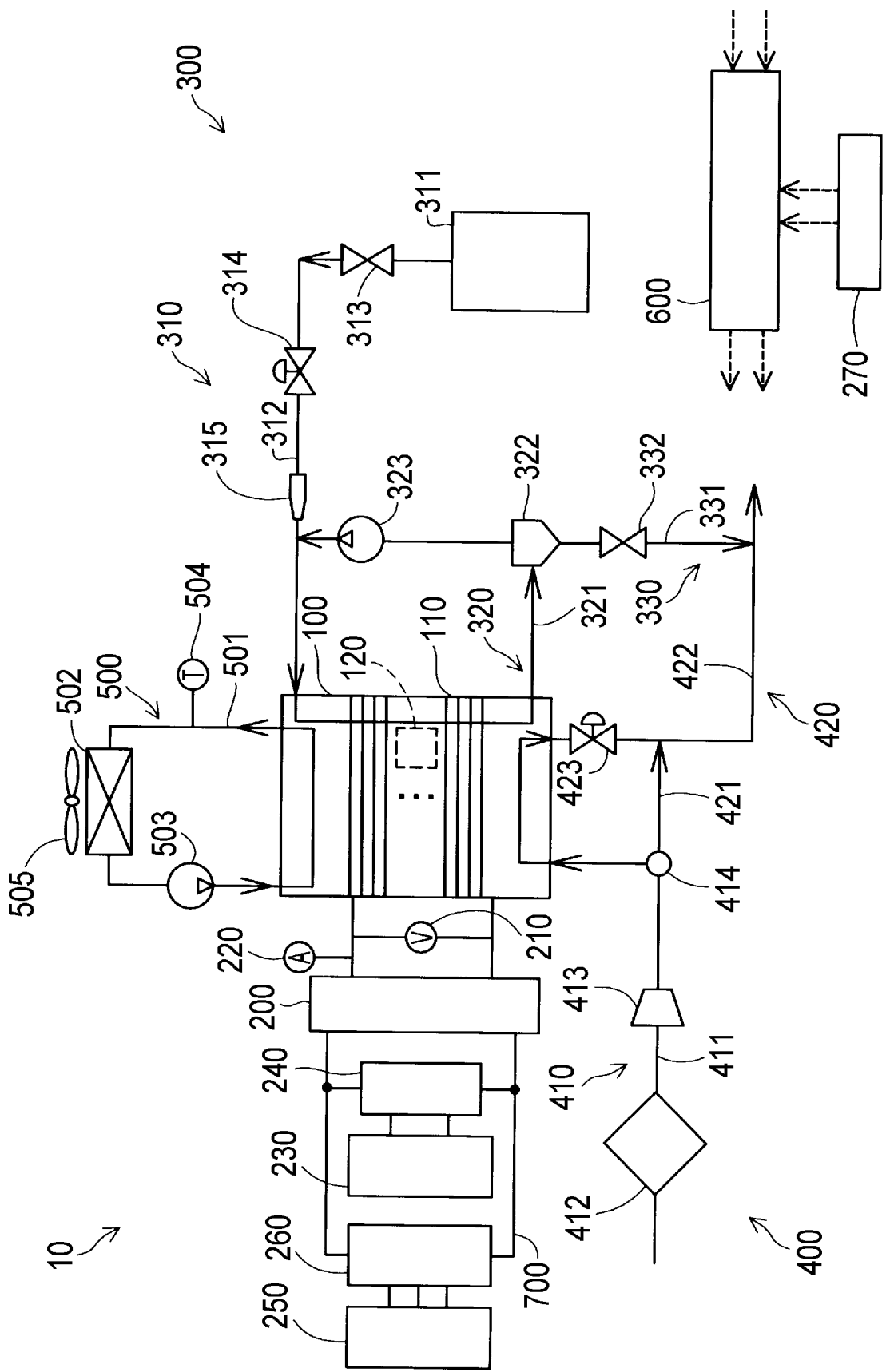
FIG. 1 is a schematic configuration diagram of a fuel cell system.

FIG. 1 is a schematic configuration diagram of a fuel cell system 10 as a first embodiment. The fuel cell system 10 includes a fuel cell 100, a DC/DC converter 200, a voltage sensor 210, a current sensor 220, a secondary battery 230, a secondary battery converter 240, a load device 250, a DC/AC inverter 260, an operation switch 270, a fuel gas supply and discharge unit 300, an oxidation gas supply and discharge unit 400, a refrigerant circulation unit 500, and a controller 600. In the fuel cell system 10, the fuel cell 100 and the secondary battery 230 can each supply power to the load device 250 independently. Alternatively, both the fuel cell 100 and the secondary battery 230 can simultaneously supply power to the load device 250.

The fuel cell 100 and the load device 250 are connected through the DC/DC converter and wiring 700. The DC/DC converter 200 and the secondary battery converter 240 are connected in parallel to the wiring 700.

The fuel cell 100 is a power generation device that generates direct-current power by receiving supply of hydrogen gas as fuel gas and oxygen gas as oxidation gas from the outside. The fuel cell 100 has a stack structure in which a plurality of fuel cell units 110 that is a unit module for power generation is stacked. In the fuel cell unit 110, an anode and a cathode are disposed with an electrolyte membrane having proton conductivity interposed therebetween. In the present embodiment, the fuel cell 100 is a solid polymer fuel cell.

The fuel cell 100 further includes a plurality of cell unit voltage sensors 120. The cell unit voltage sensor 120 is supported by a fuel cell stack through insulating collars disposed at both ends of the cell unit voltage sensor 120. In the present embodiment, the cell unit voltage sensor 120 is provided for a pair of fuel cell units 110 in the fuel cell 100 and detects a voltage for one fuel cell unit 110 obtained from a measured voltage. In FIG. 1, one cell unit voltage sensor is illustrated.

The DC/DC converter 200 has a function of changing an output state of the fuel cell 100 in response to a control signal of the controller 600. The DC/DC converter 200 receives power of a predetermined voltage from the fuel cell 100, and outputs power obtained by converting a current and a voltage by switching control in the DC/DC converter 200. Specifically, the DC/DC converter 200 boosts power generated by the fuel cell 100 to a voltage that is available in the load when supplying the power to the load device 250.

The voltage sensor 210 acquires an output voltage of the entire fuel cell 100. The voltage sensor 210 outputs a signal indicating a measured value of the acquired output voltage to the controller 600. The current sensor 220 acquires an output current of the fuel cell 100.

The secondary battery converter 240 has a function of controlling charging and discharging of the secondary battery 230 in response to the control signal of the controller 600. The secondary battery converter 240 receives power of a predetermined voltage from the DC/DC converter 200 connected to the fuel cell 100, and outputs power obtained by converting a current and a voltage by switching control to the secondary battery 230. Specifically, when the power generated by the secondary battery 230 is supplied to the load device 250, the secondary battery converter 240 boosts a voltage of the power to a voltage that is available in the load and supplies the obtained power to the load device 250. As a result, the secondary battery converter 240 controls the output voltage of the fuel cell 100 through the DC/DC converter 200 by setting an output side voltage of the DC/DC converter 200 connected to the fuel cell 100 under the control of the controller 600.

The secondary battery converter 240 receives power of a predetermined voltage from the secondary battery 230, and outputs power obtained by converting a current and a voltage by switching control to the DC/AC inverter 260 connected to the load device 250. Specifically, when the power received from the DC/DC converter 200 is supplied to the secondary battery 230, the secondary battery converter 240 boosts a voltage of the power to a voltage at which charging is possible in the secondary battery 230 and supplies the obtained power to the secondary battery 230. As a result, the secondary battery converter 240 regulates stored power of the secondary battery 230 by setting a target voltage on the secondary battery 230 side under the control of the controller 600. The secondary battery converter 240 disconnects the connection between the secondary battery 230 and the wiring 700 in a case where charging and discharging are not needed in the secondary battery 230.

The load device 250 is operated by the power supplied from the fuel cell 100 and the secondary battery 230. In the present embodiment, the load device 250 means a drive motor, various auxiliary devices, and the like.

The DC/AC inverter 260 converts direct-current power supplied from the fuel cell and the secondary battery 230 through the wiring 700 into three-phase alternating-current power. The DC/AC inverter 260 is electrically connected to the load device 250 and supplies the three-phase alternating-current power to the load device 250.

The operation switch 270 instructs the controller 600 to start and stop the fuel cell system 10. In the present embodiment, the operation switch 270 is operated by an operation by a user. When the operation switch 270 is turned on by the user, the fuel cell system 10 receives a start-up request from the controller 600, and hydrogen gas is supplied into the fuel cell 100 to start power generation.

The fuel gas supply and discharge unit 300 includes a fuel gas supply system 310, a fuel gas circulation system 320, and a fuel gas discharge system 330. The fuel gas supply system 310 supplies hydrogen gas to the fuel cell 100. The fuel gas supply system 310 includes a fuel gas tank 311, a fuel gas supply passage 312, an on-off valve 313, a pressure reducing valve 314, and an injector 315. The fuel gas tank 311 stores high-pressure hydrogen gas. The fuel gas supply passage 312 supplies the hydrogen gas in the fuel gas tank 311 to the fuel cell 100. The on-off valve 313 allows the hydrogen gas in the fuel gas tank 311 to flow downstream in an open state. The pressure reducing valve 314 regulates a pressure of hydrogen gas on an upstream side of the injector 315 under the control of the controller 600. The injector 315 is an on-off valve that is electromagnetically driven according to a drive cycle or a valve opening time set by the controller 600. The injector 315 regulates the supply amount of hydrogen gas supplied to the fuel cell 100.

The fuel gas circulation system 320 circulates anode off-gas discharged from the fuel cell 100 through the fuel gas supply passage 312. The fuel gas circulation system 320 includes a fuel gas circulation passage 321, a gas-liquid separator 322, and a circulation pump 323. The fuel gas circulation passage 321 is connected to the fuel cell 100 and the fuel gas supply passage 312. The fuel gas circulation passage 321 is composed of a pipe through which the anode off-gas directed to the fuel gas supply passage 312 flows.

The gas-liquid separator 322 separates liquid water from the anode off-gas mixed with water. The gas-liquid separator 322 is provided in the fuel gas circulation passage 321. The circulation pump 323 circulates the anode off-gas in the fuel gas circulation passage 321 toward the fuel gas supply passage 312 by driving a motor (not shown).

The fuel gas discharge system 330 discharges the anode off-gas and the water generated by the power generation of the fuel cell 100 into the atmosphere. The fuel gas discharge system 330 has an exhaust drain passage 331 and an exhaust drain valve 332. The exhaust drain passage 331 is a pipe that allows a discharge port of the gas-liquid separator 322 that discharges water and an oxidation gas discharge passage 422 described below to communicate with each other. The exhaust drain valve 332 opens and closes the exhaust drain passage 331. The exhaust drain valve 332 is disposed in the exhaust drain passage 331. The exhaust drain valve 332 is opened by receiving an instruction from the controller 600 at a predetermined timing. With this, the exhaust drain valve 332 is opened, and nitrogen gas that is impurity gas contained in the anode off-gas is discharged to the outside together with water through the exhaust drain passage 331 and the oxidation gas discharge passage 422. The predetermined timing is, for example, a timing at which the amount of water stored in the gas-liquid separator 322 becomes equal to or greater than a predetermined amount of liquid water.

The oxidation gas supply and discharge unit 400 supplies oxygen gas to the fuel cell 100 and discharges cathode off-gas from the fuel cell 100. The oxidation gas supply and discharge unit 400 includes an oxidation gas supply system 410 and an oxidation gas discharge system 420. The oxidation gas supply system 410 supplies oxygen gas to the fuel cell 100. The oxidation gas supply system 410 includes an oxidation gas supply passage 411, an air cleaner 412, a compressor 413, and a flow dividing valve 414.

The oxidation gas supply passage 411 supplies oxygen gas to the fuel cell 100. The oxidation gas supply passage 411 is a pipe that is disposed on an upstream side of the fuel cell 100 and allows the outside and a cathode side of the fuel cell 100 to communicate with each other. The air cleaner 412 removes foreign matter in the oxygen gas supplied to the fuel cell 100. The air cleaner 412 is provided on an upstream side of the compressor 413 in the oxidation gas supply passage 411. The compressor 413 discharges compressed air toward the cathode side of the fuel cell 100 in response to an instruction from the controller 600. The compressor 413 is provided on an upstream side of the fuel cell 100. The compressor 413 is driven by a motor (not shown) that operates in response to an instruction from the controller 600. The flow dividing valve 414 can allow or stop the supply of oxygen gas to the fuel cell 100. The flow dividing valve 414 is configured such that, when an opening degree of the flow dividing valve 414 is regulated, a flow rate of oxidation gas that flows toward the fuel cell 100 from the oxidation gas supply passage 411 and a flow rate of oxidation gas that flows through a bypass 421 that branches off from the oxidation gas supply passage 411 so as not to pass through the fuel cell 100 described below are regulated. Oxygen gas that flows through the bypass 421 is discharged into the atmosphere via the oxidation gas discharge passage 422 described below.

The oxidation gas discharge system 420 discharges the oxidation gas. The oxidation gas discharge system 420 includes the bypass 421, the oxidation gas discharge passage 422, and a pressure regulation valve 423. The oxidation gas discharge passage 422 discharges cathode off-gas containing the oxygen gas discharged from the fuel cell 100 and the oxygen gas that flows through the bypass 421 into the atmosphere. The pressure regulation valve 423 is configured such that, when an opening degree of the pressure regulation valve 423 is regulated, a back pressure of a passage on the cathode side of the fuel cell 100 is regulated. The pressure regulation valve 423 is provided on an upstream side of a connection part with the bypass 421 in the oxidation gas discharge passage 422.

The refrigerant circulation unit 500 supplies a refrigerant for cooling the fuel cell 100 heated by power generation to the fuel cell 100. A temperature of the fuel cell 100 is kept within a predetermined range by the refrigerant circulated by the refrigerant circulation unit 500. The refrigerant circulation unit 500 includes a refrigerant pipe 501, a radiator 502, a refrigerant pump 503, and a refrigerant temperature sensor 504. The refrigerant pipe 501 is a pipe for circulating the refrigerant for cooling the fuel cell 100. The radiator 502 has a fan 505 that takes in outside air, and cools the refrigerant by exchanging heat between the refrigerant in the refrigerant pipe 501 and the outside air. The refrigerant pump 503 is driven by an instruction of the controller 600 to feed the refrigerant into the fuel cell 100. The refrigerant temperature sensor 504 detects a temperature of the refrigerant discharged from the fuel cell 100 after being circulated through the fuel cell 100. In the present embodiment, the refrigerant temperature sensor 504 functions as a temperature acquisition unit that acquires the temperature of the fuel cell 100. In the present specification, the temperature of the fuel cell 100 refers to the temperature acquired by the refrigerant temperature sensor 504. As the temperature acquisition unit, for example, a sensor that directly detects an internal temperature of the fuel cell 100 may be used.

The controller 600 is composed of a so-called microcomputer including a CPU, a ROM, a RAM, and the like for executing logical operations. The controller 600 obtains detection signals from various sensors provided in the fuel cell system 10, and performs various controls regarding the fuel cell system 10. For example, the controller 600 outputs a drive signal to each unit such that power corresponding to the power requested from the load can be obtained from at least one of the fuel cell 100 and the secondary battery 230. Specifically, in a case where the power is obtained from the fuel cell 100, the amount of reaction gas supplied from the fuel gas supply and discharge unit 300 or the oxidation gas supply and discharge unit 400 is controlled such that desired power can be obtained from the fuel cell 100. In addition, the controller 600 controls the DC/DC converter 200 and the secondary battery converter 240 such that desired power is supplied from at least one of the fuel cell 100 and the secondary battery 230 to the load device 250. The controller 600 further includes a timer, and thus, it is possible to measure an elapsed time after input of various signals or execution of various processes.

When the fuel cell system 10 is started under a low temperature condition, the controller 600 determines whether the passage of the reaction gas in the fuel cell 100 is frozen while performing a warm-up operation, and determines whether or not the fuel cell system 10 can be operated based on the result. This is because, when the power generation of the fuel cell 100 is performed while the reaction gas passage is frozen, the reaction gas cannot sufficiently flow in the fuel cell 100, and the power generation may be hindered.

Figure 2:
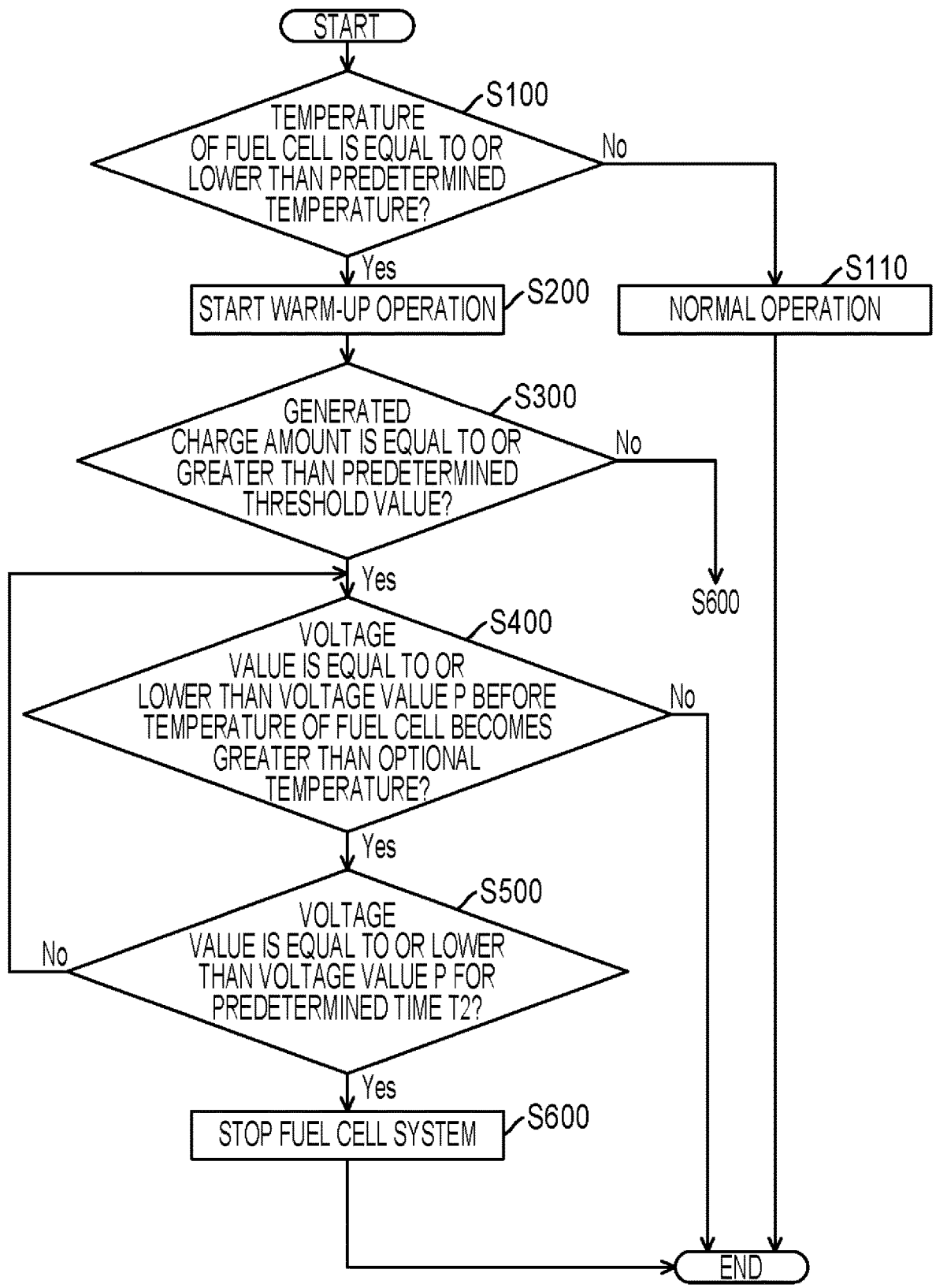
FIG. 2 is a flowchart showing a process of determining whether or not operation is possible, the process being executed by a controller.

FIG. 2 is a flowchart showing a process of determining whether or not operation is possible, the process being executed by the controller 600. The process of determining whether or not operation is possible is executed when the fuel cell system 10 receives a start-up request. In the present embodiment, when the operation switch 270 is turned on, the fuel cell system 10 receives a start-up request from the controller 600. When the fuel cell system 10 receives the start-up request, operation of the fuel cell 100 by the secondary battery 230 is started.

In Step S100, the controller 600 determines whether or not the temperature of the fuel cell 100 is equal to or lower than a predetermined temperature. In the present embodiment, the predetermined temperature is zero degrees. In a case where the fuel cell system 10 is used at a highland having a lower atmospheric pressure, the predetermined temperature can be changed according to an atmospheric pressure in a use environment. An atmospheric pressure in a use environment may be directly detected by an atmospheric pressure sensor provided in the fuel cell system 10, or may be estimated from an elevation of a location of the fuel cell system 10 based on position information of the fuel cell system 10.

When determination is made that the temperature of the fuel cell 100 is greater than zero degrees in Step S100, the process proceeds to Step S110. When determination is made that the temperature of the fuel cell 100 is equal to or lower than zero degrees, the process proceeds to Step S200.

In Step S110, the controller 600 executes a normal operation of the fuel cell system 10, and then the process ends. A normal operation of the fuel cell system 10 in the present embodiment means an operation state in which the warm-up operation is not performed and fuel cell system 10 is performed by the power generation by the fuel cell 100.

In Step S200, the warm-up operation is started. The warm-up operation refers to an operation state in which the temperature of the fuel cell 100 is actively raised such that the temperature of the fuel cell 100 reaches a predetermined temperature range as a steady state. In a case where the temperature of the fuel cell 100 at the start of the fuel cell system 10 is equal to or lower than zero degrees, first, the warm-up operation is performed such that the temperature of the fuel cell 100 exceeds the predetermined temperature of zero degrees. After the temperature of the fuel cell 100 exceeds zero degrees by the warm-up operation, the warm-up operation is performed such that the temperature of the fuel cell 100 reaches a predetermined temperature range as a steady state. After the temperature of the fuel cell 100 exceeds zero degrees, more power can be output from the fuel cell 100 than in the warm-up operation executed when the fuel cell 100 is equal to or lower than zero degrees.

As the warm-up operation, for example, a method can be adopted in which a flow rate of oxygen gas supplied to the fuel cell 100 is controlled more than during the normal operation of the fuel cell system 10 determined that the fuel cell 100 is not frozen, thereby increasing a power generation loss of the fuel cell 100 and raising the temperature of the fuel cell 100 by self-heating. The warm-up operation is executed by the controller 600.

In Step S300, the controller 600 determines whether or not a generated charge amount is equal to or greater than a predetermined threshold value. The generated charge amount of the fuel cell 100 is calculated by the controller 600 using the output current of the fuel cell acquired by the current sensor 220. The generated charge amount of the fuel cell 100 can be obtained by integrating a product of a time after the fuel cell system 10 is started upon receiving the start-up request and the output current of the fuel cell 100. In the present embodiment, a charge amount B is used as the predetermined threshold value used for the determination in Step S300. The charge amount B is a generated charge amount obtained from the fuel cell 100 before generation of heat enough to eliminate the freezing in the fuel cell 100.

Figure 3:
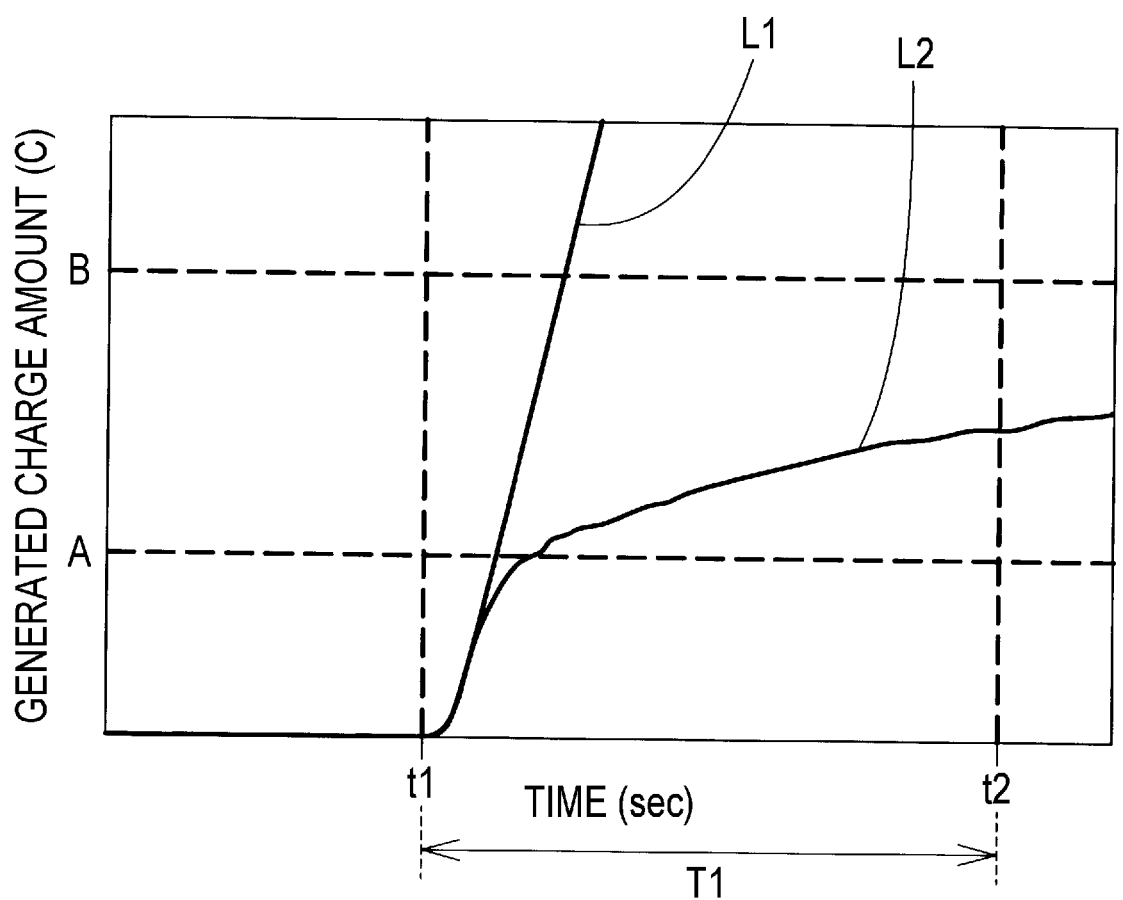
FIG. 3 is a graph showing a state in which a generated charge amount of a fuel cell changes after a warm-up operation is started.

FIG. 3 is a graph showing a state in which the generated charge amount of the fuel cell 100 changes after the warm-up operation of the fuel cell 100 is started. A horizontal axis represents a time, and a vertical axis represents a generated charge amount. A time at the start of the fuel cell system 10 is shown as time t1. The controller determines whether or not the generated charge amount exceeds the charge amount B from time t1 that is a power generation start time to time t2 when predetermined elapsed time T1 has elapsed.

In a case where hydrogen gas flows in the fuel cell 100, the generated charge amount of the fuel cell 100 increases with the lapse of time (see L1 in FIG. 3). On the other hand, in a case where the hydrogen gas is not supplied to the fuel cell 100 due to the freezing inside the fuel cell 100, the generated charge amount increases until the generated charge amount reaches a charge amount A as in the case where the hydrogen gas flows; however, thereafter, the degree of increase in the generated charge amount is largely suppressed (see L2 in FIG. 3). The charge amount A represents a charge amount that can be generated by using hydrogen gas that remains inside the fuel cell 100 when the fuel cell system 10 is started. In the case of L2, after power generation is performed using the hydrogen gas that remains inside the fuel cell 100, the amount of hydrogen gas supplied to an anode is insufficient due to freezing. In this case, the output current of the fuel cell 100 is restricted by the controller 600, and the degree of increase in the generated charge amount is suppressed. The restriction of the output current of the fuel cell 100 will be described below.

When the generated charge amount becomes equal to or greater than the charge amount B within elapsed time T1, the process proceeds to Step S400 (see L1 in FIG. 3). Otherwise, the process proceeds to Step S600 (see L2 in FIG. 3).

In Step S400, determination is made whether or not voltage values of one or more fuel cell units 110 become equal to or lower than a predetermined voltage value P before the temperature of the fuel cell 100 becomes greater than an optional temperature by the warm-up operation. In a case where the voltage values of one or more fuel cell units 110 become equal to or lower than the predetermined voltage value P before the temperature of the fuel cell 100 becomes greater than the optional temperature by the warm-up operation, the process proceeds to Step S500 at that time. In other cases, the warm-up operation ends, and the controller 600 ends the process.

During the warm-up operation, a target voltage and a target current of the fuel cell 100 are set such that the self-heating of the fuel cell 100 increases as described above. When a passage of the hydrogen gas is frozen in any of the fuel cell units 110 in the fuel cell 100 during the warm-up operation, the hydrogen gas supplied to the anode is insufficient in the fuel cell unit 110, and thus, the power generation reaction is suppressed. Even in such a case, since the power generation reaction is continued in the other fuel cell unit 110, the fuel cell unit 110 in which the hydrogen gas is insufficient acts as a resistor in the fuel cell 100 and generates a negative voltage. When the warm-up operation is continued in such a state, the fuel cell 100 may be damaged.

Therefore, in the present embodiment, in a case where the voltage value of the individual fuel cell unit 110 becomes equal to or lower than a predetermined value, the output current is restricted by the controller 600, and a power generation amount of the fuel cell 100 is suppressed. In the present embodiment, in a case where the voltage value of the individual fuel cell unit 110 becomes a negative voltage, the output current is restricted by the controller 600. The output current is restricted to a current value at which power for the operation of the fuel cell system 10 cannot be supplied. A restriction value of the output current is determined by the voltage value detected by the cell unit voltage sensor 120. With this, damage to the fuel cell 100 is suppressed.

Here, a case where a negative voltage is generated even after determination is made that the generated charge amount becomes greater than the charge amount B by the warm-up operation will be described (see Step S400 in FIG. 2). For example, when an outside temperature drops after Step S300, the passage of the hydrogen gas of the fuel cell unit 110 inside the fuel cell 100 is frozen, and a negative voltage is generated. In addition, it is considered that generated water thawed by the warm-up operation moves to a place in the passage of the hydrogen gas where the temperature is lower than zero degrees to re-freeze, and the passage of the hydrogen gas is blocked to generate a negative voltage.

In Step S500, in a case where the voltage values of one or more fuel cell units 110 are continuously equal to or lower than the predetermined voltage value P for predetermined time T2, the process proceeds to Step S600. In a case where the voltage value exceeds the voltage value P that is a predetermined voltage value before predetermined time T2 elapses, the freezing in the fuel cell 100 may be eliminated. Therefore, in these cases, the process proceeds to Step S400, and the warm-up operation is continued. In Step S400 again, determination is made again whether or not the voltage value of the fuel cell unit 110 becomes equal to or lower than the voltage value P before the temperature of the fuel cell 100 becomes greater than an optional temperature. In Step S400 again, in a case where the voltage values of one or more fuel cell units 110 do not become equal to or lower than the predetermined voltage value P before the temperature of the fuel cell 100 becomes greater than the optional temperature, the process ends.

In a case where a determination result in Step S500 is Yes, it is considered that it is difficult to thaw the freezing inside the fuel cell 100 by the warm-up operation. The controller 600 determines that a stop condition of the fuel cell system 10 is satisfied, and in Step S600, the controller 600 stops the fuel cell system 10 and the process ends.

With the fuel cell system 10 of the present embodiment configured as described above, the warm-up operation is started when the temperature of the fuel cell 100 is equal to or lower than a predetermined temperature. In a case where the generated charge amount after the start of power generation of the fuel cell 100 becomes equal to or greater than the charge amount B within elapsed time T1, the warm-up operation is continued. Even in a case where the generated charge amount is equal to or greater than the charge amount B, the passage of the hydrogen gas in the fuel cell 100 may be frozen due to, for example, a decrease in outside temperature, and the voltage may become equal to or lower than the predetermined voltage value P. In a case where the voltage is continuously equal to or lower than the predetermined voltage value P for predetermined time T2, there is a possibility that freezing that is difficult to be thawed by the warm-up operation occurs in the fuel cell 100. When the fuel cell system 10 is continuously warmed up in this state, power is consumed more than generated power. In such a case, the operation of the fuel cell system 10 is stopped by the controller 600. With this, it is possible to avoid a situation in which power is continuously consumed more than generated power. As a result, power for the next start-up of the fuel cell system 10 can be left.

B. Second Embodiment

Figure 4:
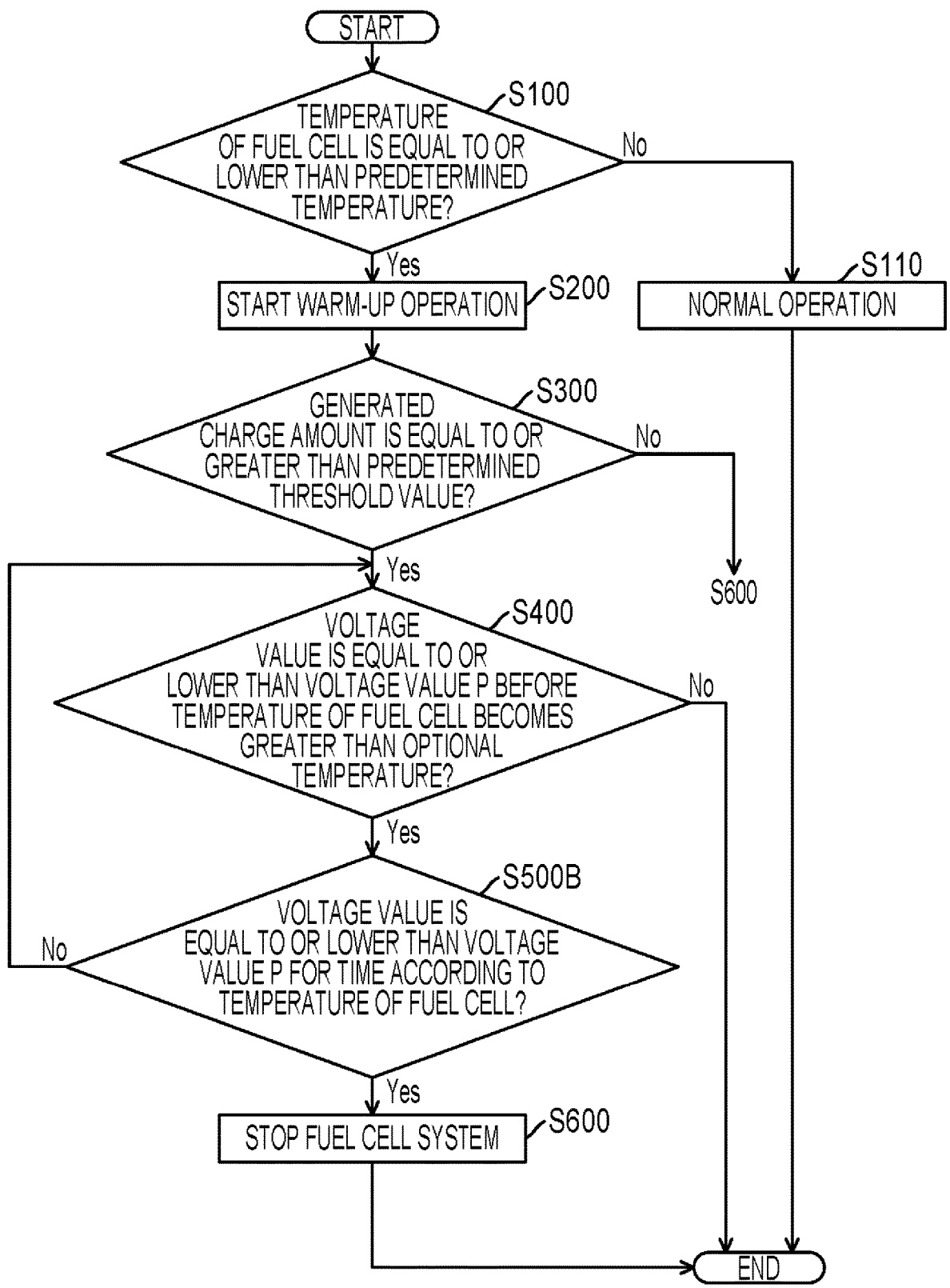
FIG. 4 is a flowchart showing a process of determining whether or not operation is possible, the process being executed by a controller according to a second embodiment.

FIG. 4 is a flowchart showing a process of determining whether or not operation is possible, the process being executed by the controller 600 according to a second embodiment. Since the fuel cell system 10 of the second embodiment has the same configuration as that of the fuel cell system 10 shown in FIG. 1, detailed description thereof will be omitted using the same reference numerals. In the flowchart of the second embodiment shown in FIG. 4, steps common to those in FIG. 2 are denoted by the same step numbers, and detailed description thereof will be omitted. The second embodiment is different from the first embodiment in that predetermined time T2 is set by the controller 600 according to the temperature of the fuel cell 100.

Figure 5:
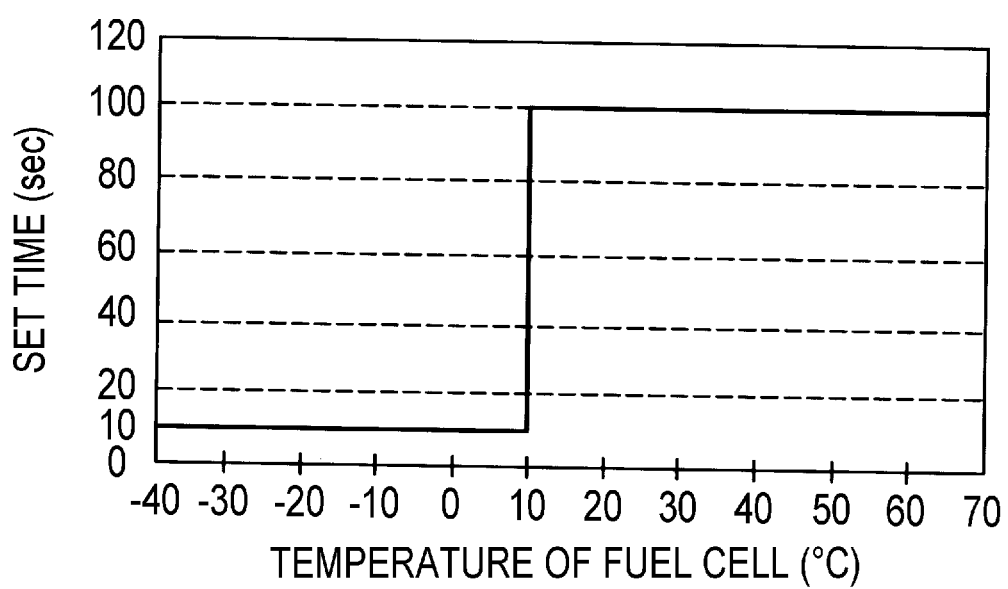
FIG. 5 is a table showing a freezing determination time according to a temperature of the fuel cell.

FIG. 5 is a table showing a freezing determination time according to the temperature of the fuel cell 100. In the first embodiment, predetermined time T2 in Step S500 is constant regardless of the temperature of the fuel cell 100. In Step S500B of the second embodiment, predetermined time T2 is set according to the temperature of the fuel cell 100 acquired by the refrigerant temperature sensor 504.

In a case where the temperature of the fuel cell 100 is a temperature at which the freezing in the fuel cell 100 is likely to be thawed, the freezing in the fuel cell 100 may be thawed by continuing the warm-up operation. Therefore, predetermined time T2 is set to be long by the controller 600. On the other hand, in a case where the temperature of the fuel cell 100 is a temperature at which the freezing is less likely to be thawed, the thawing state may not be eliminated even though the warm-up operation is continued. Therefore, predetermined time T2 is made shorter than a time when the freezing is likely to be thawed. With this, power consumption can be suppressed. In the present embodiment, the temperature at which the freezing is likely to be thawed is greater than 10 degrees, and the temperature at which the freezing is less likely to be thawed is equal to or lower than 10 degrees. The temperature at which the freezing of the fuel cell 100 is likely to be thawed may be a temperature that is different from that of the present embodiment, such as a temperature greater than 11 degrees or a temperature greater than 12 degrees, depending on an environment in which the fuel cell system 10 is disposed.

In Step S500B of FIG. 4, in a case where the temperature of the fuel cell 100 is nine degrees, the fuel cell system 10 continues the warm-up operation for 10 seconds according to an instruction of the controller 600 (see FIG. 5). In a case where the voltage values of one or more fuel cell units 110 do not become equal to or lower than the voltage value P continuously for 10 seconds, the freezing may be thawed by continuing the warm-up operation. In this case, the warm-up operation is continued, and the process proceeds to Step S400 again.

In a case where determination is made to be YES in Step S400 again, the process proceeds to Step S500B again. In Step S500B again, in a case where the temperature of the fuel cell 100 acquired by the refrigerant temperature sensor 504 rises to 10.5 degrees, the freezing in the fuel cell 100 may be thawed by continuing the warm-up operation. Therefore, predetermined time T2 is set to 100 seconds longer than the previous 10 seconds. Then, the warm-up operation is continued for 100 seconds. In addition, the controller 600 determines whether or not the voltage value measured by the cell unit voltage sensor 120 continuously exceeds the voltage value P.

In Step S500B, in a case where the temperature of the fuel cell is equal to or lower than 10 degrees, predetermined time T2 is 10 seconds, and when the temperature is greater than 10 degrees, predetermined time T2 is 100 seconds. Predetermined time T2 is 100 seconds in a case where the temperature is equal to or greater than 10 degrees, and predetermined time T2 may be 10 seconds in a case where the temperature is lower than 10 degrees.

In this way, in a case where the temperature of the fuel cell 100 measured by the refrigerant temperature sensor 504 is a temperature at which the freezing in the fuel cell 100 is likely to be thawed by continuing the warm-up operation, predetermined time T2 can be lengthened by the controller 600. With this, since the warm-up operation is continued, the freezing in the fuel cell 100 is more likely to be thawed.

On the other hand, in Step S500B, in a case where the temperature of the fuel cell 100 is equal to or lower than 10 degrees, it may be difficult to thaw the freezing in the fuel cell 100 even though the warm-up operation is continued. In this case, determination is made whether or not the voltage values of one or more fuel cell units 110 are continuously equal to or lower than the voltage value P for T2 without making predetermined time T2 longer than 10 seconds. Continuing the warm-up operation by lengthening predetermined time T2 leads to power consumption of the fuel cell system 10. Therefore, in a case where it is difficult to thaw the freezing of the fuel cell 100, power consumption of the fuel cell system 10 can be suppressed by stopping the operation of the fuel cell system 10 early.

C. Other Embodiments

C1) In the embodiment, the fuel cell 100 is a solid polymer fuel cell. However, for example, the fuel cell may be a solid oxide fuel cell, or a fuel cell other than a solid polymer fuel cell may be used.

C2) In the embodiment, the cell unit voltage sensor 120 is provided for a pair of fuel cell units 110 in the fuel cell 100 and detects a voltage for one fuel cell unit 110 obtained from a measured voltage. However, for example, the cell unit voltage sensor may detect an output voltage of each fuel cell unit. In addition, one cell unit voltage sensor may detect a voltage of each of some typical fuel cell units.

C3) In the embodiment, in a case where the voltage value of the individual fuel cell unit 110 becomes equal to or lower than the predetermined value, the output current is restricted by the controller 600, and a power generation amount of the fuel cell 100 is suppressed. In the embodiment, the voltage value of the individual fuel cell unit 110 refers to a voltage value for one fuel cell unit 110 obtained from a voltage measured by the cell unit voltage sensor 120 provided for a pair of fuel cell units 110. However, for example, the voltage value of the individual fuel cell unit may refer to a voltage value of any one of all the fuel cell units. In addition, the voltage value of the individual fuel cell unit may refer to a voltage value of any one of some typical fuel cell units.

C4) In the embodiment, in Step S400, determination is made whether or not the voltage values of one or more fuel cell units 110 become equal to or lower than the predetermined voltage value P before the temperature of the fuel cell 100 becomes greater than an optional temperature by the warm-up operation. The optional temperature is a temperature at which the controller determines that the warm-up operation can end, and is a temperature at which the freezing in the fuel cell is thawed. The optional temperature may be 15 degrees or 20 degrees. In addition, for example, the optional temperature may be set to be higher than the temperature at which the freezing in the fuel cell is thawed by five degrees, unlike the temperature at which the freezing in the fuel cell is thawed. In addition, in Step S400, determination may be made whether or not the voltage values of one or more fuel cell units 110 become equal to or lower than the predetermined voltage value P before a time sufficient for the temperature of the fuel cell to be greater than the optional temperature by the warm-up operation has elapsed. The time sufficient for the temperature of the fuel cell to be greater than the optional temperature may be 30 minutes or one hour.

In the embodiment, in Step S400, when the voltage values of one or more fuel cell units 110 become equal to or lower than the predetermined voltage value P, the process proceeds to Step S500. However, for example, when the voltage values of the fuel cell units of 10% or more become equal to or lower than the predetermined voltage value P, the process may proceed to Step S500.

C5) In the embodiment, in Step S500, in a case where the voltage values of one or more fuel cell units 110 are continuously equal to or lower than the predetermined voltage value P for predetermined time T2, the process proceeds to Step S600. However, for example, in a case where the voltage values of the fuel cell units 110 of 10% or more are continuously equal to or lower than the predetermined voltage value P for predetermined time T2, the process proceeds to Step S600.

C6) In the embodiment, the stop condition includes that the generated charge amount is equal to or greater than the predetermined threshold value after the start of the warm-up operation. However, for example, the stop condition does not include whether or not the generated charge amount is equal to or greater than the predetermined threshold value, and may include that the temperature of the fuel cell becomes equal to or greater than a certain temperature after the start of warm-up operation. The certain temperature may be optional temperature, such as two degrees or five degrees.

C7) In the second embodiment, predetermined time T2 is 10 seconds at a temperature of 10 degrees or less, and is 100 seconds at a temperature of higher than 10 degrees. However, for example, predetermined time T2 is 20 seconds at a temperature of 11 degrees or less, and may be 50 seconds at temperature of higher than 11 degrees. In addition, for example, every time the temperature of the fuel cell rises from 10 degrees by five degrees, predetermined time T2 may increase by 10 seconds.

The present disclosure is not limited to the embodiment, and can be realized by various configurations within a range not deviating from the gist thereof. For example, the technical features of the embodiments corresponding to the technical features in each of the aspects described in the summary of the disclosure may be replaced or combined as appropriate for the purpose of solving some or all of the problems or achieving some or all of the effects. In addition, unless the technical features are described in the present specification as required technical features, the technical features can be deleted as appropriate.

What is claimed is:
1. A fuel cell system comprising:
   a fuel cell that includes a plurality of stacked fuel cell units;
   a current sensor configured to acquire an output current of the fuel cell;

a temperature acquisition unit configured to acquire a temperature of the fuel cell;

a cell unit voltage sensor configured to detect a voltage of each of the fuel cell units; and a controller configured to control the fuel cell system, wherein the controller is configured to restrict the output current of the fuel cell when the voltage of the individual fuel cell unit becomes equal to or lower than a predetermined value in a warm-up operation, execute the warm-up operation when the temperature of the fuel cell is equal to or lower than a predetermined temperature, after the fuel cell system receives a start-up request, and stop an operation of the fuel cell system when a stop condition including that the voltage of the fuel cell unit is continuously equal to or lower than a predetermined voltage value for a predetermined time is satisfied after start of the warm-up operation.

2. The fuel cell system according to claim 1, wherein the controller is configured to set the predetermined time according to the temperature of the fuel cell acquired by the temperature acquisition unit.

3. The fuel cell system according to claim 1, wherein the stop condition includes that a generated charge amount after the fuel cell system receives the start-up request is equal to or greater than a predetermined threshold value after the start of the warm-up operation, the generated charge amount being calculated by using the output current of the fuel cell.

* * * * *